(12) United States Patent
Hagiwara (10) Patent No.: US 7,433,543 B2
(45) Date of Patent: Oct. 7, 2008

(54) IMAGE PROCESSING APPARATUS AND METHOD, AND IMAGE SENSING APPARATUS

(75) Inventor: Shinichi Hagiwara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 396 days.

(21) Appl. No.: 11/191,033

(22) Filed: Jul. 28, 2005

(65) Prior Publication Data

US 2006/0029292 A1  Feb. 9, 2006

(30) Foreign Application Priority Data

Aug. 4, 2004  (JP)  ............................. 2004-228014

(51) Int. Cl.
*G06K 9/32*  (2006.01)
(52) U.S. Cl. ...................................... 382/296; 382/276
(58) Field of Classification Search ................. 382/276, 382/296, 297
See application file for complete search history.

(56) References Cited

U.S. PATENT DOCUMENTS

| | | | | |
|---|---|---|---|---|
| 5,900,909 A | * | 5/1999 | Parulski et al. | ........... 348/231.6 |
| 6,148,149 A | * | 11/2000 | Kagle | ........................... 396/50 |
| 6,262,769 B1 | * | 7/2001 | Anderson et al. | ......... 348/333.1 |
| 6,597,817 B1 | * | 7/2003 | Silverbrook | ................. 382/289 |
| 6,747,693 B1 | * | 6/2004 | Yamashita et al. | ........ 348/222.1 |
| 2001/0043758 A1 | * | 11/2001 | Yamaguchi et al. | .......... 382/297 |

FOREIGN PATENT DOCUMENTS

| | | |
|---|---|---|
| JP | 10-233993 | 9/1998 |
| JP | 10-336660 | 12/1998 |

* cited by examiner

*Primary Examiner*—Samir A Ahmed
*Assistant Examiner*—Stephen R Koziol
(74) *Attorney, Agent, or Firm*—Fitzpatrick, Cella, Harper & Scinto (57) ABSTRACT

An image processing method is for processing image data that has been captured by an image sensing apparatus having an image sensing device in which a plurality of photoelectric conversion elements are arrayed two-dimensionally for outputting an electric signal in accordance with an incident amount of light. According to the method, attitude information representing the attitude of the image sensing apparatus is input and, in a case where the input attitude information of the image sensing apparatus indicates an attitude that has been specified in advance, the image data is subjected to rotation processing, which conforms to the attitude specified in advance, successively in units of a prescribed number of pixels divided into a plurality of areas.

9 Claims, 11 Drawing Sheets

8 PIXELS

8 PIXELS

| I | J | K | L | M | N | O | P |
| Q | R | S |   |   |   |   |   |
|   |   |   |   |   |   |   |   |
|   |   |   |   |   |   |   |   |
|   |   |   |   |   | a | b | c |
| d | e | f | g | h | i | j | k |

| I | J | K | L | M | N | O | P |
| Q | R | S |   |   |   |   |   |
|   |   |   |   |   |   |   |   |
|   |   |   |   |   |   |   |   |
|   |   |   |   |   | a | b | c |
| d | e | f | g | h | i | j | k |

☒ : SYMBOL THAT INDICATES PIXEL READ OUT

FIG. 6

8×8 PIXELS AFTER ROTATION
PROCESSING THROUGH
90° IN CLOCKWISE DIRECTION

IMAGE PROCESSING APPARATUS AND METHOD, AND IMAGE SENSING APPARATUS

FIELD OF THE INVENTION

This invention relates to an image processing apparatus and method as well as an image sensing apparatus. More particularly, the invention relates to an image processing apparatus and method and an image sensing apparatus for applying processing, which conforms to the attitude of the image sensing apparatus, to an image captured by the image sensing apparatus.

BACKGROUND OF THE INVENTION

Conventionally, an image processing apparatus for processing an image captured by an image sensing apparatus such as a digital camera records the image data representing the captured image in a recording unit following compression or as is if compression has not been applied. Further, the image processing apparatus reads the image data out of the recording unit at the time of playback and displays the image on the display screen of a monitor, irrespective of the attitude of the camera at the time of image sensing, following expansion if the data has been compressed or as is if the data has not been compressed.

Figure 10A:
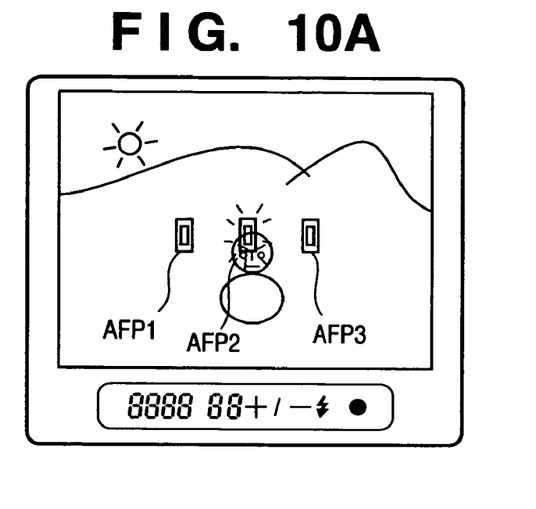
FIGS. 10A to 10C are diagrams illustrating the relationship among an observed image when the image is taken in the landscape orientation, the image data and the image reproduced and displayed according to the prior art.
Figure 10B:
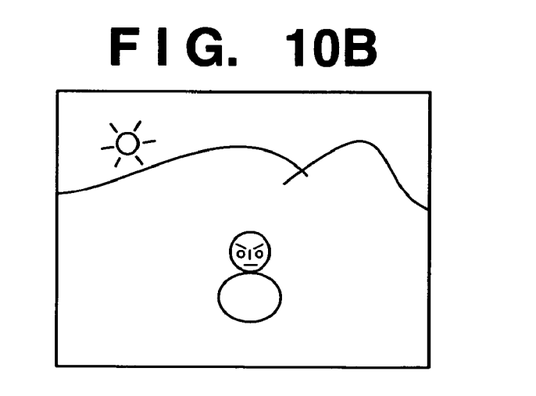
Figure 10C:
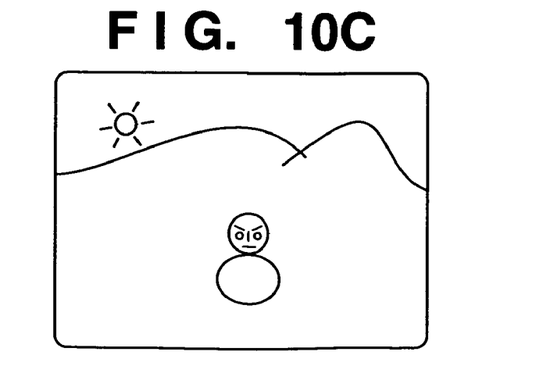

FIGS. 10A to 10C illustrate the relationship between the attitude of a camera when an image is taken and the image displayed on the monitor. FIG. 10A shows the observed image that appears in an image sensing area viewed from the finder of the camera at the time of image sensing. This illustrates a situation where an image is taken with a camera attitude in which the image sensing area is long in the width direction (this is referred to as "landscape orientation"). FIG. 10B illustrates conceptually the image data that is output from an image sensing device when an image is taken in the landscape orientation shown in FIG. 10A. FIG. 10C illustrates this image when it has been displayed on a display unit such as a TV. In this case it is understood that the direction of the image displayed is the same as the direction of the observed image as viewed from the finder at the time of image sensing.

Figure 11A:
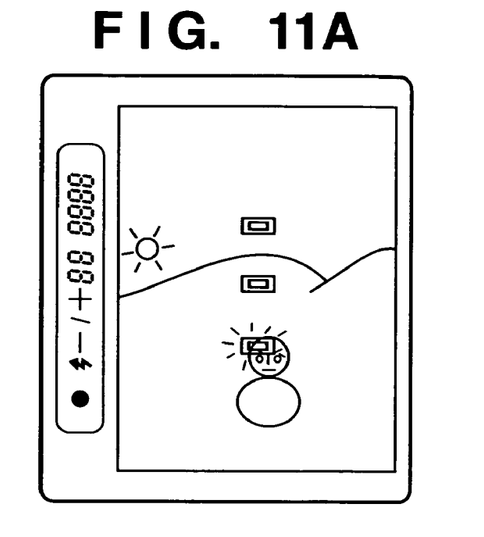
FIGS. 11A to 11C are diagrams illustrating the relationship among an observed image when the image is taken in the portrait orientation, the image data and the image reproduced and displayed according to the prior art.
Figure 11B:
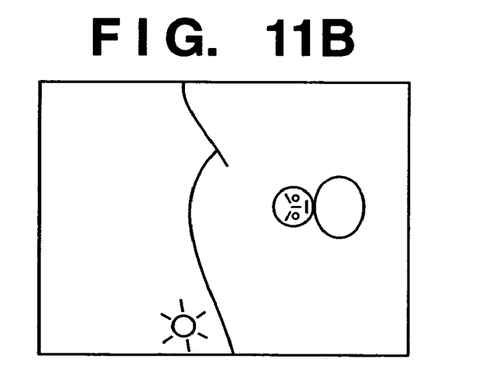
Figure 11C:
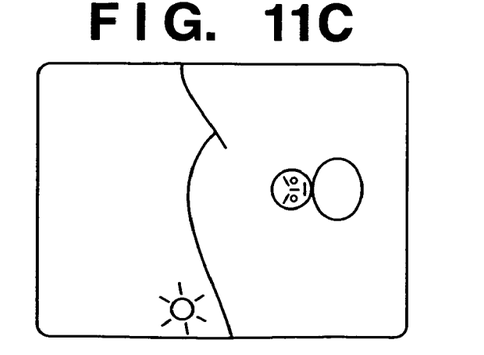

FIGS. 11A to 11C similarly illustrate the relationship between the attitude of the camera when an image is taken and the image displayed on the monitor. FIG. 11A shows the observed image that appears in the image sensing area viewed from the finder of the camera at the time of image sensing. This illustrates a situation where an image is taken with a camera attitude in which the image sensing area is long in the height direction (referred to as "portrait orientation"). In this example, the camera has been rotated 90° in the clockwise direction. FIG. 11B illustrates conceptually the image data that is output from the image sensing device when an image is taken in the portrait orientation shown in FIG. 11A. FIG. 11C illustrates this image when it has been displayed on a display unit such as a TV. In this case the image displayed on the display unit has been rotated by 90° in the counter-clockwise direction with respect to the vertical direction of the observed image viewed from the finder by the user at the time of image sensing.

If FIGS. 10C and 11C are compared, it will be appreciated that the direction of the displayed image is correct in FIG. 10C for the case where the image was taken in the landscape orientation. As a result, one can enjoy the image as is without experiencing an odd sensation. However, in FIG. 11C where the image was taken in the portrait orientation, the direction, in which the image has been rotated 90° in the counter-clockwise direction, of the displayed image is wrong. This image cannot be enjoyed as is without experiencing an odd sensation.

In order to deal with this problem, the specification of Japanese Patent Application Laid-Open No. 10-233993 proposes detecting the attitude of the camera at the time of image sensing using a camera attitude sensor and, in accordance with the detected camera attitude, changing the order in which image data, which has been stored in a frame memory, is read out, thereby generating compressed image data representing an image in which the direction of the observed image at the time of image sensing becomes the same as the direction of the image displayed on a display unit.

Further, the specification of Japanese Patent Application Laid-Open No. 10-336660 proposes providing a camera orientation detector for detecting whether the longitudinal direction in an image sensing area of the camera is the portrait orientation or the landscape orientation, and two types of quantization tables, namely one for the portrait orientation and one for the landscape orientation. A quantization table selector selects one of the quantization tables in accordance with the camera orientation and outputs the selected table to a quantization processing circuit. Further, DCT (Direct Cosine Transform) coefficients that have been output from a DCT processing circuit are quantized in the quantization processing circuit using the quantization table selected.

However, in a case where processing for rotation by 90° in the clockwise direction or 270° in the clockwise direction (namely by 90° in the counter-clockwise direction) at the time of display is executed in accordance with attitude information, which prevailed at the time of image sensing, that has been appended to the image data, so that an image captured in the portrait orientation can be enjoyed without an odd sensation, the rotation processing takes a considerable time. Since the time required by this rotation processing lengthens as the image information, namely the number of pixels, increases, there is an increase in waiting time from the moment a switch member for reproducing and displaying an image is operated to the moment the image is displayed.

SUMMARY OF THE INVENTION

The present invention has been made in consideration of the above situation and its object is to make it possible to eliminate a temporary storage memory (work register) for rotation processing, shorten the time it takes to execute processing for rotating an image that has been captured in the portrait orientation and reproduce the image in a display in the portrait orientation on a display unit in a playback processing time equal to that of an image captured in the landscape orientation.

According to the present invention, the foregoing object is attained by providing an image processing apparatus for processing image data that has been captured by an image sensing apparatus having a two-dimensional image sensing device, the apparatus comprising: an attitude information input unit that inputs attitude information representing the attitude of the image sensing apparatus; and a rotating unit which, in a case where the attitude information of the image sensing apparatus that has been input by the attitude information input unit indicates an attitude that has been specified in advance, subjects the image data to rotation processing, which conforms to the attitude specified in advance, successively in units of a prescribed number of pixels corresponding to divided areas of the image data.

According to another aspect of the present invention, the foregoing object is attained by providing an image sensing apparatus having a two-dimensional image sensing device, comprising: an attitude detecting unit that detects the attitude of the image sensing apparatus; and a rotating unit which, in a case where the attitude of the image sensing apparatus that has been detected by the attitude detecting unit indicates an attitude that has been specified in advance, subjects the image data to rotation processing, which conforms to the attitude specified in advance, successively in units of a prescribed number of pixels corresponding to divided areas of the image data.

In still another aspect of the present invention, the foregoing object is attained by providing an image processing method for processing image data that has been captured by an image sensing apparatus having two-dimensional image sensing device, the method comprising: inputting attitude information representing the attitude of the image sensing apparatus; and in a case where the attitude information of the image sensing apparatus indicates an attitude that has been specified in advance, subjecting the image data to rotation processing, which conforms to the attitude specified in advance, successively in units of a prescribed number of pixels corresponding to divided areas of the image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

A first embodiment of the present invention will now be described.

Figure 1:
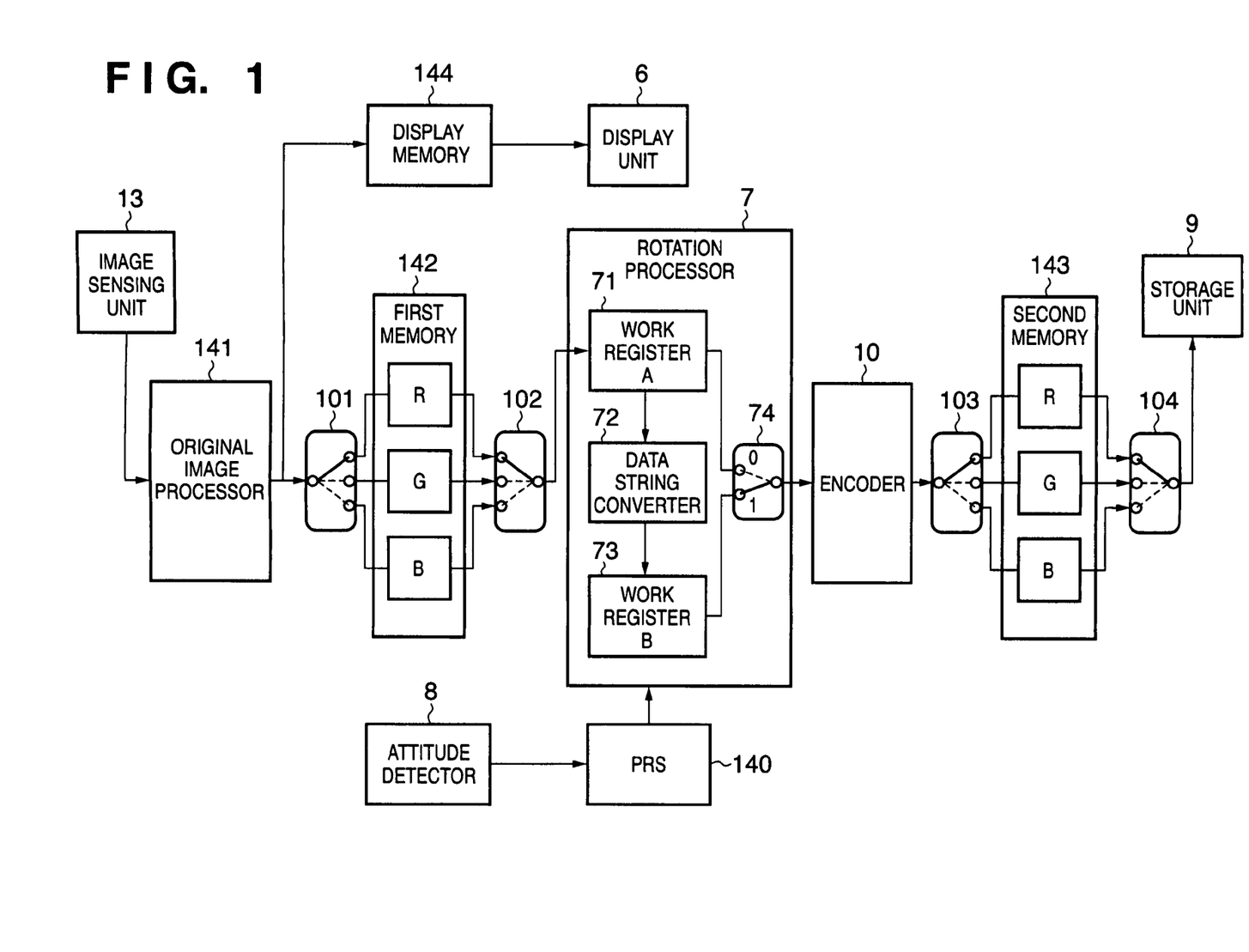
FIG. 1 is a block diagram illustrating the structure of a digital camera according to a first embodiment of the present invention.

FIG. 1 is a block diagram illustrating the structure of an image sensing apparatus such as a digital camera according to a first embodiment of the present invention.

Depicted in FIG. 1 are an image sensing unit 13 comprising a CCD area sensor or the like; an original image processor 141 for processing an image signal from the image sensing unit 13; a first memory 142; a rotation processor 7; an encoder 10; a second memory 143; a storage unit 9 comprising a non-volatile memory having enough capacity to hold image data of a plurality of images; an attitude detector 8 for detecting the attitude of an image processing apparatus; a microcontroller (PRS) 140 for controlling overall image processing; a display memory 144 and a display unit 6 such as an LCD. Switches 101, 102, 103 and 104 are also provided for changing over input and output of data, as will be described later. The PRS 140 is a one-chip computer provided internally with a CPU (Central Processing Unit), RAM, ROM, EEPROM (Electrically Erasable Programmable ROM) and input/output ports, etc. The PRS 140 executes a series of operations based upon a sequence program that has been stored in the ROM.

The characterizing feature of the present invention resides in the rotation processor 7, described later. In FIG. 1, therefore, an arrow symbol from the PRS 140 has been attached only to the rotation processor 7 for the purpose of making it clear that it is under the control of the PRS 140. However, the other components in FIG. 1 also are under the control of the PRS 140.

The image sensing unit 13 comprises an image sensing device such as a CCD area sensor and a sensor driver for driving the image sensing device. When light from a subject forms an image on the image sensing device through an optical system (not shown), the image sensing device subjects the light to an photoelectric conversion and outputs the resultant electric signal to the original image processor 141. The original image processor 141, which has an A/D conversion function, converts the analog electric signal from the image sensing unit 13 to digital data, reduces noise components by a low-pass filter, executes a series of image processing operations relating to so-called image composing, such as pixel and color interpolation processing as well as a white balance correction and gamma correction, and separately outputs color components R, G and B.

The signals output from the original image processor 141 are stored in the first memory 142 on an RGB color-component basis by operation of the switch 101. They are also sent to the display memory 144 for display on the display unit 6, such as an LCD (Liquid Crystal Display, with which the camera is equipped.

When one screen of image data is stored in the first memory 142 as the color components R, G, and B, the image data is sent to the rotation processor 7 successively on a per-RGB component basis via the switch 102. The rotation processor 7 includes a work register A71, a data string converter 72, a work register B73 and a switch 74 for selecting and outputting the output of the work register A71 or work register B73. After the image data has been separated into the R, G and B color components, each color component of the image data that has been stored in the first memory 142 is stored in the work register A71 and work register B73. The work register A71 and work register B73 each have a capacity for storing 64 pixels of any color component.

The rotation processor 7 processes the image data on a per-color-component basis in accordance with the attitude of the digital camera when an image is taken and outputs the processed data to the encoder 10. The determination as to whether the digital camera is in the landscape orientation or portrait orientation is made by the attitude detector 8. The PRS 140 receives the output of the attitude detector 8 and changes over the nature of control in the rotation processor 7. Specifically, when an image has been taken in the landscape orientation, the image data that has entered the work register A71 via the switch 102 is output to the encoder 10 via the switch 74. On the other hand, when an image has been taken in the portrait orientation, the image data that has entered the work register A71 via the switch 102 is directed through the data string converter 72 and work register B73 and is then output to the encoder 10 via the switch 74 upon being subjected to processing described later.

A DCT (Discrete Cosine Transform) and a Huffman conversion, which are based on the JPEG format, are executed as examples of encoding and compressing processing performed by the encoder 10. Since a DCT and Huffman conversion per se are well known, these will not be described here. It should be noted that the present invention is not limited by the method of encoding and compression and that it is possible to use other well-known methods. Besides a DCT and Huffman transform, processing that conforms to the encoding and compressing method, such as a discrete wavelet transform, may be executed as appropriate.

After encoding and compression have been executed by the encoder 10, the image data of each color is stored temporarily in the second memory 143 on a per-color basis via the switch 103. The above-described image read-out from the first memory 142, processing by the rotation processor 7 and encoding processing by the encoder 10 are repeated first for one screen's worth of the R component, and encoding processing is executed one screen at a time on a per-color basis, namely for one screen's worth of the G component and one screen's worth of the B component. Before or after this processing, the PRS 140 generates a header and/or footer (information such as the date and time of image sensing operation) of any format with regard to the encoded image data as necessary and records the header and/or footer in the second memory 143 together with the image data.

The image data of each color and the header and/or footer of any format that have been recorded in the second memory 143 are output to the storage unit 9 via the switch 104.

The storage unit 9, which is a non-volatile storage member having enough capacity to hold image data of a plurality of images, is removably loaded in the image sensing apparatus itself. Accordingly, with the storage unit 9 loaded in the image sensing apparatus, after image data from the second memory 143 is stored in the storage unit 9 via the switch 104 for a plurality of images, the storage unit 9 is thenceforth removed from the image sensing apparatus and can be loaded in another system or apparatus that is capable of reading the image data in a data format the same as that of the present image sensing apparatus, and the stored image data can be reproduced, edited or saved in this other system or apparatus.

Next, the rotation processing operation will be described with reference to FIGS. 2A to 6. Described first will be an instance where an image has been taken in the landscape orientation, in which case rotation processing is not executed.

FIGS. 2A to 2D illustrate processing in a case where an image was taken with the camera being held in the landscape orientation. These drawings illustrate the relationship among the area of a subject at the time of image sensing, the output image of the image sensing unit 13 in FIG. 1 and the data stored in the first memory 142 and second memory 143. Here a case will be described where a plane in which a plurality of letters have been written is adopted as the subject area so as to clarify the difference in nature of signal processing that is based upon camera attitude at the time of image sensing.

Figure 2A:
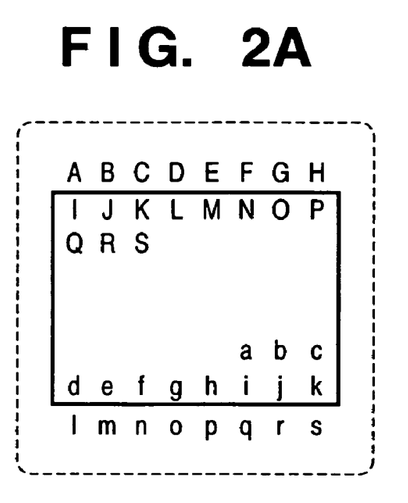
FIGS. 2A to 2D are diagrams useful in describing read-out processing executed when an image is taken in the landscape orientation according to the first embodiment.
Figure 2B:
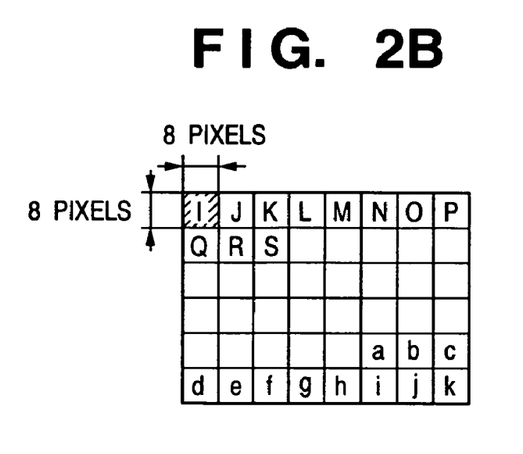

In FIG. 2A, a zone enclosed by the dashed line indicates a subject area in which letter information "A" to "S" and "a" to "s" comprises a certain plane. Further, a zone enclosed by the solid line is an observation area as seen from the camera finder. This area coincides with the image sensing area. Here the letter information "A" to "H" and "l" to "s" lies outside the image sensing area and is not imaged. FIG. 2B is a conceptual view of image data that is output from the image sensing device, and it will be understood that the character information "A" to "H" and "l" to "n" is not being imaged.

The image data representing the sensed image is separated into the R, G, and B color components by a series of processing operations in the original image processor 141 in the order in which the image data is read out of the image sensing device, and the data is stored in the first memory 142 on a per-color-component basis.

Figure 2C:
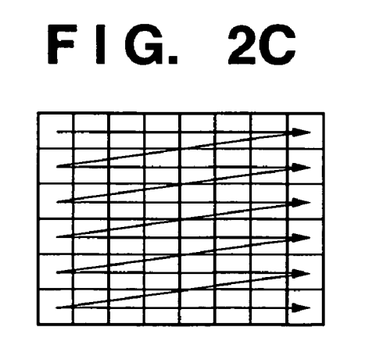

FIG. 2C illustrates the order in which 8×8 pixels, which serve as one unit, are read out of the first memory 142. If an image has been taken in the landscape orientation, the order of read-out from the first memory 142 in terms of the imaged areas of 8×8 pixels is "I" to "P", "Q" to "S" to "a" to "c" and "d" to "k", as indicated by the arrows. Thus, in units of 8×8 pixels, a raster scan is converted to a zigzag scan to read image data out of the first memory 142. The reason for adopting 8×8 pixels as the unit of read-out from the image sensing device involves the interface between the encoder 10 and rotation processing, and it is particularly preferred in view of the processing speed that read-out is to be performed in the processing units of encoding and compression in encoder 10.

After the image data that has been read out of the first memory 142 is transferred to the work register A71 within the rotation processor 7, the image data is sent to the encoder 10 via the switch 74 and is subjected to encoding processing, after which the encoded data is stored in the second memory 143. At this time the switch 74 selects the "0" side to thereby select the output data from the work register A71.

Figure 2D:
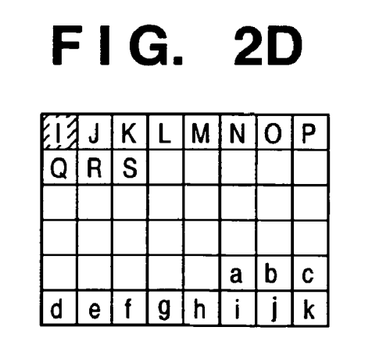

FIG. 2D illustrates the status of the image data at the moment of storage in the second memory 143 in a case where read-out has been performed in the order described above.

As illustrated in FIG. 2, if the image was taken with the camera in the landscape orientation, "k", for example, is at the lower right corner both when it is stored in the first memory 142 and in the second memory 143. Likewise, "I" is at the upper left. Thus, there is no change in the relative positional relationship of the plurality of blocks, each comprising 8×8 pixels, in the memory. It should be noted that since data that has undergone encoding processing is stored in the second memory 143, FIG. 2D of this stored data is a conceptual view regarding the content of the second memory 143 illustrated so that it is easy to compare with the content of the first memory 142.

The processing up to read-out of the image signal from the first memory 142 and storage in the second memory 143 is executed in order, one screen at a time, with regard to each of the color components R, G and B.

Thus, in a case where an image has been taken in the landscape orientation, the work register A71 performs the role of raising the processing speed relating to encoding processing as a function of a temporary storage memory when data is sent from the first memory 142 to the encoder 10.

Next, reference will be had to FIGS. 3A to 3E to describe processing in a case where an image has been taken with the camera in the portrait orientation. In FIGS. 3A to 3E, it is assumed that an image has been taken in the portrait orientation upon rotating the camera 900 in the clockwise direction. The upper side of the image sensing area in FIG. 2A corresponds to the right side of the image sensing area in FIG. 3A. Further, in a manner similar to that of FIGS. 2A to 2D, it is assumed that what is imaged is a subject area in which information "A" to "S" and "a" to "s" enclosed by the dashed line comprises a certain plane, and the zone enclosed by the solid line indicates an observation area as seen from the camera finder. In the portrait orientation, the letter information "A, I, Q, H, P" and "d, l, c, k, s" lies outside the image sensing area and is not imaged.

Figure 3A:
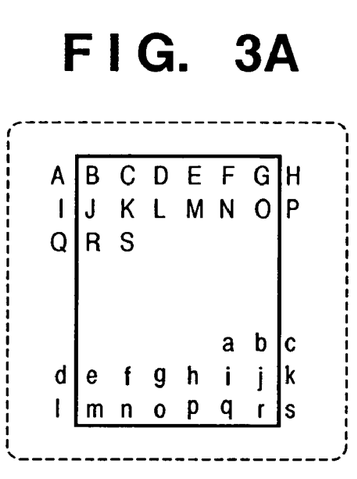
FIGS. 3A to 3E are diagrams useful in describing read-out processing that involves a rotation processing when an image is taken in the portrait orientation according to the first embodiment.
Figure 3B:
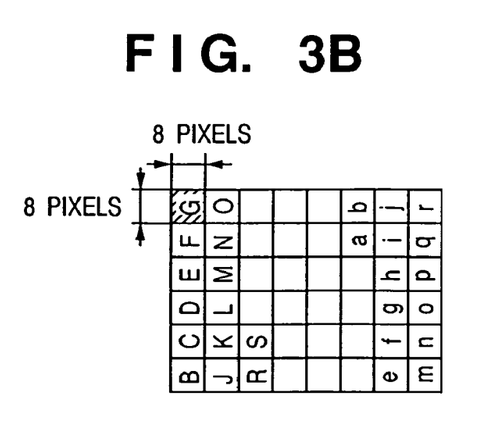

The image data representing the sensed image is separated into the R, G, and B color components by a series of processing operations in the original image processor 141 in the order in which the image data is read out of the image sensing device, and the data is stored in the first memory 142. One apparent horizontal line of the image sensing area shown in FIG. 3A is, e.g., "B, C, D, E, F, G" in case of the first line. In actuality, however, data is read from the line corresponding to the upper side of the image sensing area of FIG. 2A and therefore what is obtained is "G, O, . . . , b, j, r", as illustrated in FIG. 3B. As a result, the data of each of the apparent horizontal lines in the image sensing area shown in FIG. 3A has been stored in order in each of the columns of first memory 142. Furthermore, each character imaged has been rotated 90° in the counter-clockwise direction.

Figure 3C:
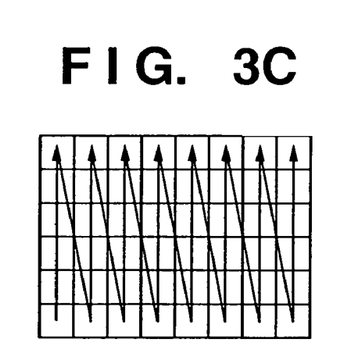

FIG. 3C illustrates the order in which 8×8 pixels, which serve as one unit, are read out of the first memory 142. Read-out is started from the 8×8 pixel block whose image content is "B" at the lower left corner of FIG. 3B, and the image whose content is "r" at the upper right corner of FIG. 3B is adopted as the 8×8 pixel block read out last. Thus, in units of 8×8 pixels, a raster scan is converted to a zigzag scan to read image data out of the first memory 142. However, control is exercised in such a manner that the order of read-out differs from that in the case where an image is taken in the landscape orientation.

Figure 3D:
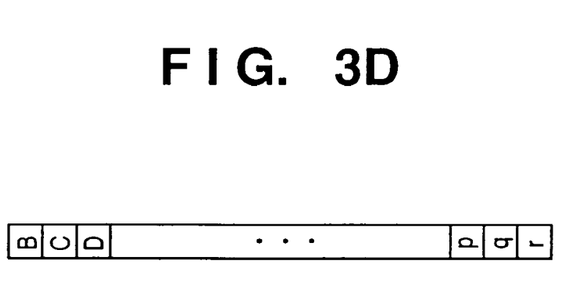

The image data that has been read out of the first memory 142 is transferred to the work register A71 in rotation processor 7. FIG. 3D is a conceptual view illustrating the order of data of 8×8 pixel units that have been read out of the first memory 142. As indicated in FIG. 3D, the read-out image data of 8×8 pixel units is data that has undergone rotation by 90° in the counter-clockwise direction. Accordingly, processing for rotation by 90° in the clockwise direction is executed by the data string converter 72 for every 8×8 pixels and then the resultant data is stored in the work register B73.

Figure 4:
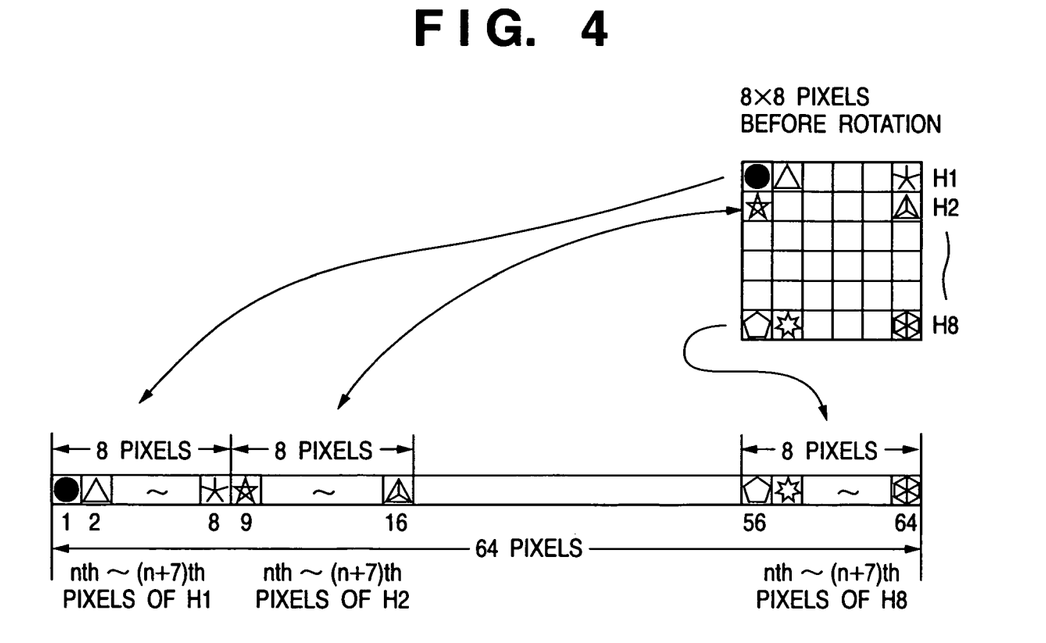
FIG. 4 is a diagram useful in describing control for read-out to a work register when an image is taken in the portrait orientation according to the first embodiment.
Figure 5A:
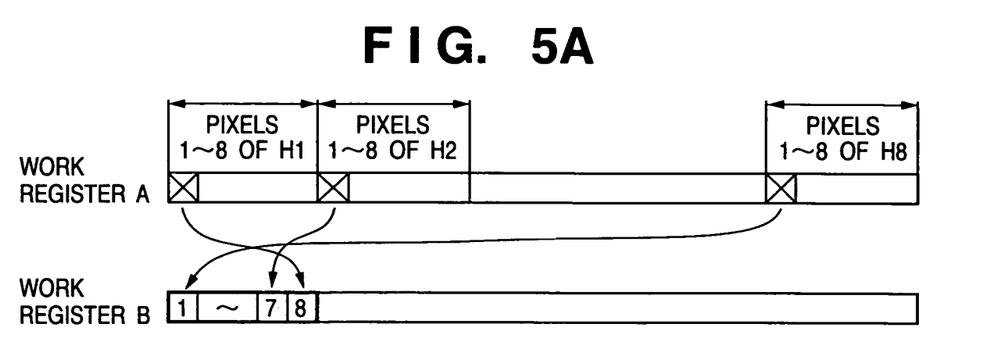
FIGS. 5A to 5C are diagrams useful in describing a rotation processing according to the first embodiment.
Figure 5B:
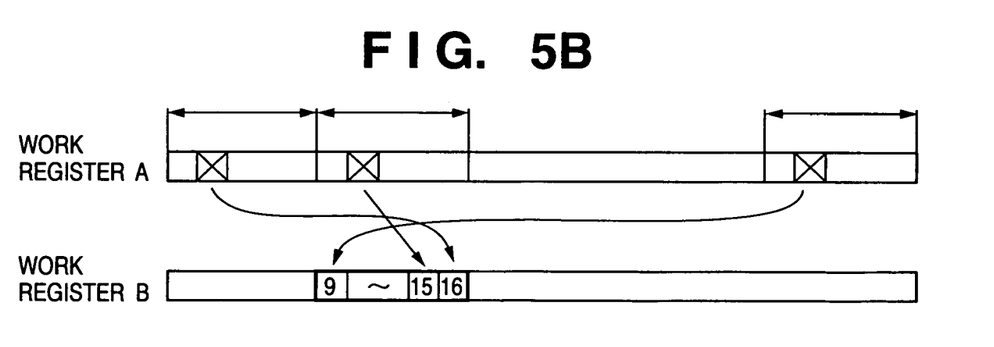
Figure 5C:
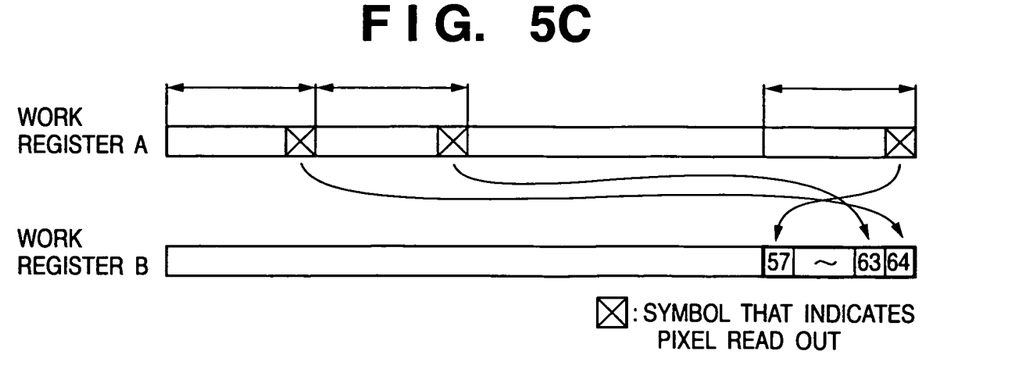
Figure 6:
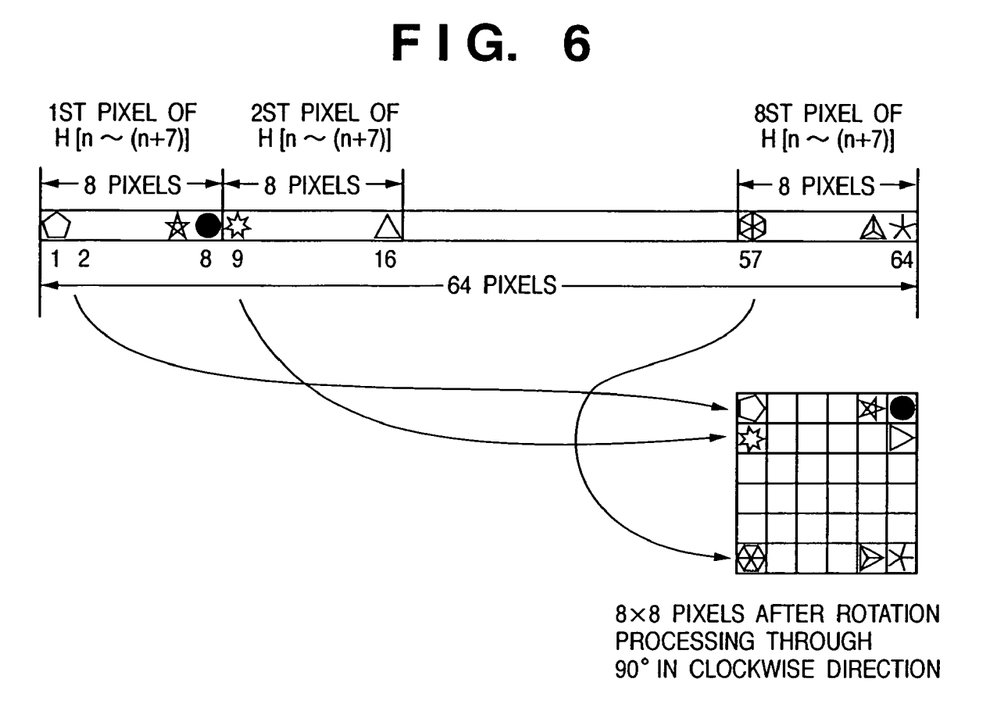
FIGS. 6 is a diagram useful in describing a rotation processing according to the first embodiment.

Reference will now be had to FIGS. 4 to 6 to describe processing in the rotation processor 7 for rotating 8×8 pixels of image data in a case where an image was taken in the portrait orientation.

FIG. 4 is a diagram useful in describing processing for storing 8×8 pixels of image data, which have been read out of the first memory 142, in the work register A71.

First, image data is read out of the first memory 142 in 8×8 pixel units in the order of read-out shown in FIG. 3C. However, the image data is stored in the work register A71 successively in the order of the pixel rows in a state in which it has not yet been subjected to rotation processing, as illustrated in FIG. 3D. In FIG. 4, a symbol such as "Δ" has been applied to each pixel in order to make it easier to understand the order of the array of pixels. Further, H1 to H8 in FIG. 4 indicate the rows within the 8×8 pixel unit, and n indicates which numbered pixel from the left in FIG. 4 is the pixel, in the overall image shown in FIG. 3B, to which the pixel at the upper left corner of the block that is the 8×8 pixel unit corresponds. For example, in case of the area where the letter information "G" has been imaged in FIG. 3B, n in FIG. 4 is "1"; if the letter information "O" has been imaged in FIG. 3B, then n is "9".

FIGS. 5A to 5C are diagrams useful in describing rotation processing executed by the data string converter 72. As illustrated in FIGS. 5A to 5C, H1 to H8 in an 8×8 pixel unit are stored in $1^{st}$ to $64^{th}$ storage areas of the work register A71, as described above in connection with FIG. 4.

After the data of each of the pixels has been stored in the $1^{st}$ to $64^{th}$ storage areas of work register A71, first only the data of the pixels at the head of each of the rows H1 to H8 is transferred to the work register B73 from the H8th row to the H1th row, as illustrated in FIG. 5A. More specifically, first the data of the pixel at the head of the H8th row is read out and stored in a first register of the work register B73. Next, the data of the pixel at the head of the H7th row is read out and stored in a second register of the work register B73. Thus, the data is transferred successively up to the data of the pixel at the head of the H1th row. In other words, data in an (8N+1)th storage area is transferred in order from N=7 to N=0, and the data is stored in the first to eighth registers of work register B73.

Similarly, as shown in FIG. 5B, only the data of the pixels at the second position from the head of each of the rows H1 to H8 is transferred to the work register B73. In other words, data in an (8N+2)th storage area is transferred in order from N=7 to N=0, and the data is stored in the $9^{th}$ to $16^{th}$ registers of work register B73.

Similar processing is repeated until the data of the pixel at the last position of each row is transferred, and only the data of the pixels at the eighth position from the head of each of the rows H1 to H8 is transferred to the work register B73, as illustrated in FIG. 5C. In other words, data in an (8N+8)th storage area is transferred in order from N=7 to N=0, and the data is stored in the $57^{th}$ to $64^{th}$ registers of work register B73.

FIG. 6 illustrates the state obtained when the image data in work register A71 has been stored up to the $64^{th}$ register of work register B73 in the manner described above. If this is compared with FIG. 4, it will be understood that processing for rotation by 90° in the clockwise direction has been completed at this time.

If the image data of 8×8 pixels following rotation is thus arranged in the work register B73, the image data is then output to the encoder 10, where it is subjected to encoding and compression processing successively and then stored in the second memory 143. At this time the switch 74 selects the "1" side to select the output data from the work register B73.

In the processing for when an image has been taken in the portrait orientation as described above, the work register A71 performs the role of raising the processing speed as a function of a temporary storage memory when data is sent from the first memory 142 to the data string converter 72, and the work register B73 performs the role of raising the processing speed as a function of a temporary storage memory when data is sent from the data string converter 72 to the encoder 10, as well as the role of raising the processing speed relating to encoding processing when data is sent from the first memory 142.

Figure 3E:
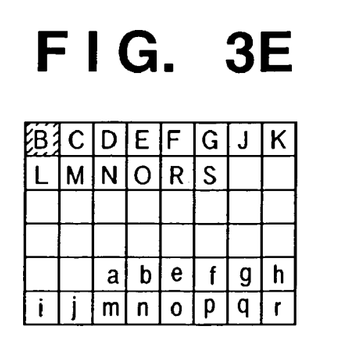

FIG. 3E illustrates the concept of the arrangement of an 8×8 pixel block when the data has been stored in the second memory 143. The reason for the wording "concept of the arrangement" when the data has been stored in the second memory 143 is that since encoding and compression processing is executed in the encoder 10, the image data is actually stored in a form different from this in the second memory 143.

The image data of the 8×8 pixel block thus subjected to rotation processing and encoding and compression processing is stored successively in the second memory 143. As a result, "B" that was at the lower left corner at the time of image sensing, as shown in FIG. 3B, now is at the upper left corner in the second memory 143, as illustrated in FIG. 3E, and "G" that was at the upper left corner in FIG. 3B now is in the sixth column of the first row in the second memory 143, as shown in FIG. 3E.

Further, "J" that was second from the lower left corner and "K" that was immediately above "J" at the time of photography, as shown in FIG. 3B, now are second from the upper right corner and at the upper right corner, respectively, in the second memory 143, as shown in FIG. 3E.

Thus, since the image data is stored in the second memory 143 in the order illustrated in FIG. 3E, the relative positional relationship of each of the blocks comprising 8×8 pixels differs from that of the time of image sensing shown in FIG. 3B.

Further, by attaching attitude information that prevailed at the time of photography to the header of the encoded image information in the second memory 143, the attitude at the time of capture of the image to be reproduced can be ascertained. As a result, even though the image data is stored as illustrated in FIG. 3E, an image in the portrait orientation having the correct width and height can be reproduced.

It should be noted that the setting of the compression rate, the size of an image recorded and output data format, etc., which are required in encoding processing, is performed for example by having the PRS 140 send the encoder 10 these values, which have been set by the user prior to shooting, at the moment the shutter switch is pressed.

Further, in the first embodiment set forth above, rotation processing is executed every 8×8 pixels. However, if it is so arranged that rotation processing is executed in prescribed units, then rotation processing becomes possible without a need for work registers of large size. By using a register capacity that corresponds to the interface with the encoder 10, the optimum capacity is employed and processing that includes encoding processing can be executed effectively.

Figure 7A:
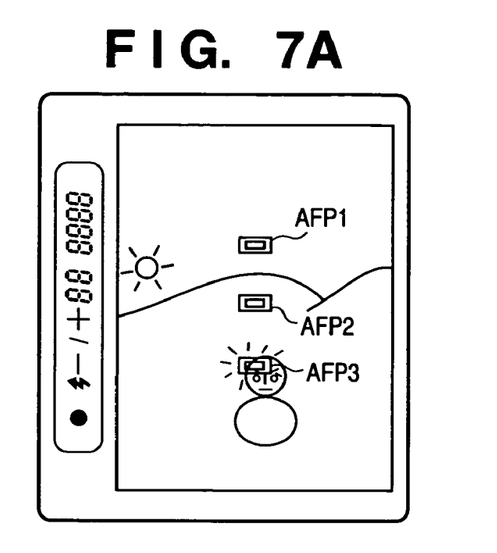
FIGS. 7A to 7C are diagrams illustrating the relationship among an observed image when an image is taken in the portrait orientation, the image data and the image reproduced and displayed according to the first embodiment.
Figure 7B:
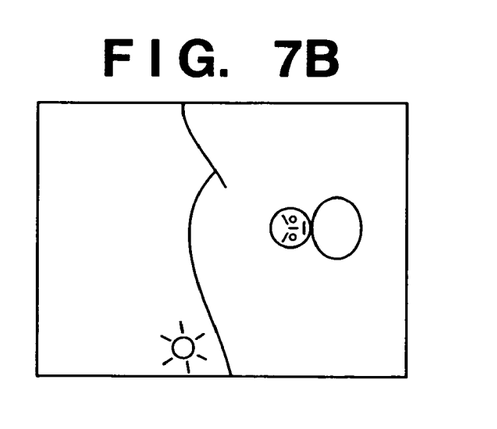
Figure 7C:
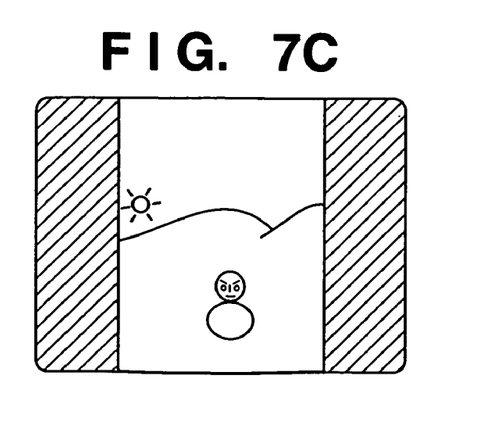

FIGS. 7A to 7C illustrate the state of an observed image when an image is taken, the output image from the image sensing device and the nature of the display on a display unit such as a TV in a case where the image was taken with the camera in the portrait orientation according to the first embodiment of the invention.

FIG. 7A illustrates the observed image in the image sensing area in a case where the finder is viewed from the camera eyepiece. Here AFP1 to AFP3 indicate three distance measuring points. Focus is adjusted using distance measuring point AFP3. FIG. 7B is a conceptual view of image data that is output from the image sensing device, and FIG. 7C illustrates a display image displayed on the display unit such as a TV.

FIGS. 7A to 7C are for a case where an image has been taken holding the camera in the portrait orientation. Consequently, the image that is output from the image sensing device has been turned on its side by rotation through 90° counter-clockwise, as illustrated in FIG. 7B. FIG. 7C illustrates the output image obtained after this image has been subjected to processing for rotating it 90° in the clockwise direction by the method of the first embodiment described above.

Since the screen of a monitor normally is long in the horizontal direction, the output image after application of 90° rotation processing is displayed after it is subjected to size-reduction processing in such a manner that the height of the image will agree with the height of the monitor screen. In this case, blank areas appear on the left and right sides of the monitor screen but these areas may be displayed monochromatically, by way of example.

In accordance with the first embodiment, as described above, image data that has been captured in the portrait orientation is compressed and encoded and then recorded in a storage unit after being subjected to rotation processing in accordance with the attitude of the camera when the image was taken. As a result, processing for rotation at the time of display and playback is unnecessary and the time needed for processing for a portrait-oriented display can be shortened.

Further, since a common size is adopted for the unit area of rotation processing for rotating image data and unit area for executing encoding processing, rotation processing and encoding can be executed successively on a per-unit area basis, the apparatus can be simplified and length of processing time from image sensing to encoding can be curtailed. It is also possible to support an increase in number of pixels employed in the image sensing device.

Second Embodiment

A second embodiment of the present invention will now be described with reference to the drawings.

According to the first embodiment, encoding is executed after rotation processing. By contrast, the second embodiment eliminates encoding processing after rotation processing.

Figure 8:
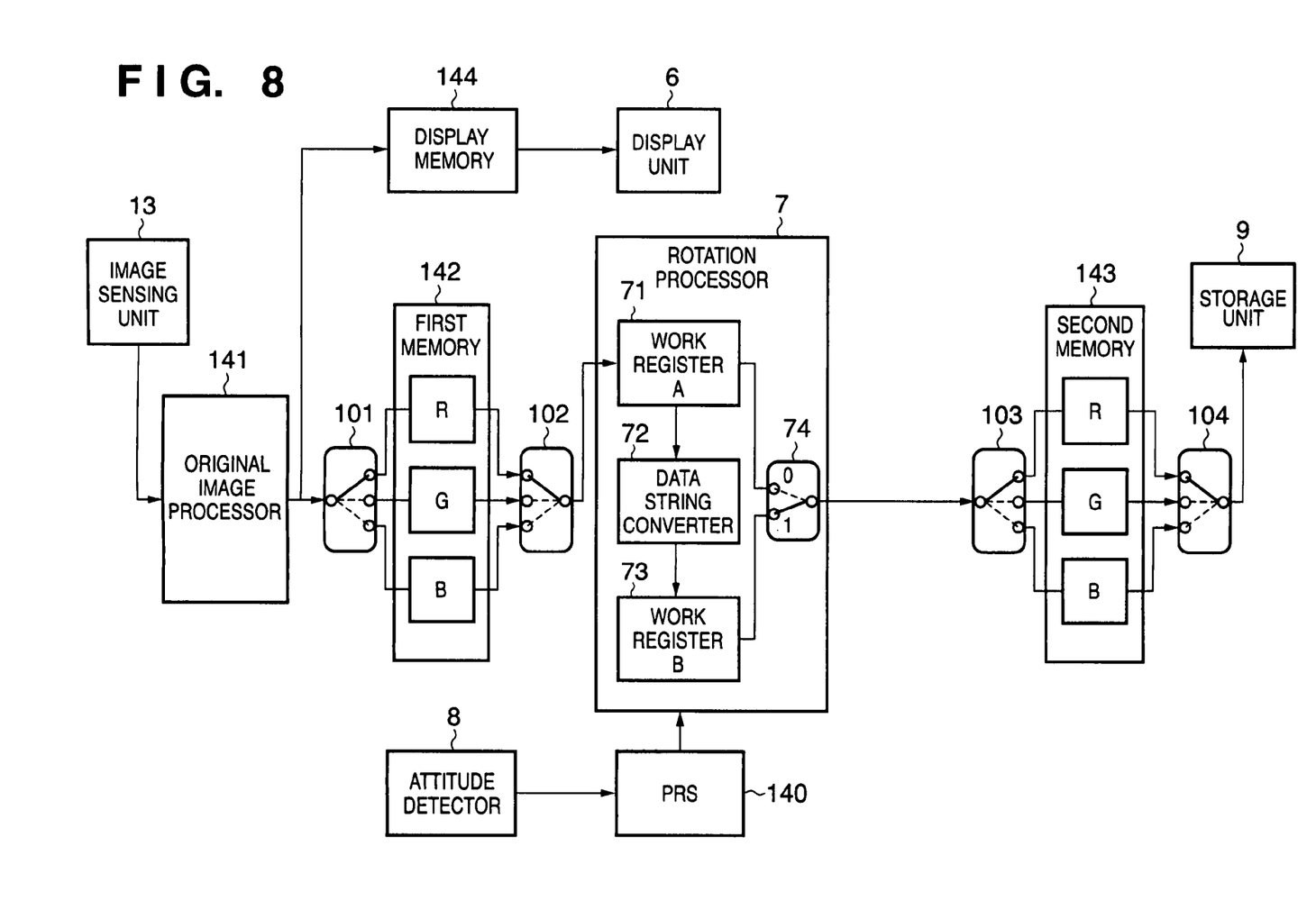
FIG. 8 is a block diagram illustrating the structure of a digital camera according to a second embodiment of the present invention.

FIG. 8 illustrates the structure of an image sensing apparatus according to the second embodiment. Here the encoder 10 has been eliminated from the arrangement of FIG. 1. The structure of this embodiment is identical with that of FIG. 1 in other respects and explanation of these identical components is omitted.

Although this will depend upon the size of the image information that is output from the image sensing unit 13, in the second embodiment an image that has undergone rotation processing can be sent to the storage unit 9 without degradation of the image by eliminating encoding processing.

In accordance with the second embodiment, as described above, image data that has been captured in the portrait orientation is recorded in a storage unit after being subjected to rotation processing in accordance with the attitude of the camera at the time of image sensing. As a result, rotation processing at the time of display and playback is unnecessary and the length of time required for processing for a portrait-oriented display can be shortened. Further, since encoding processing is not executed, an image can be stored, reproduced and displayed without a decline in image quality.

Third Embodiment

A third embodiment of the present invention will now be described with reference to the drawings.

According to the first embodiment, after image data has been encoded following rotation processing, the encoded data is temporarily stored in memory, and then output to the storage unit 9. By contrast, in the third embodiment, encoding processing is executed after image data has been stored in memory following rotation processing, and the encoded output is delivered to the storage unit 9 without being stored temporarily in memory.

Figure 9:
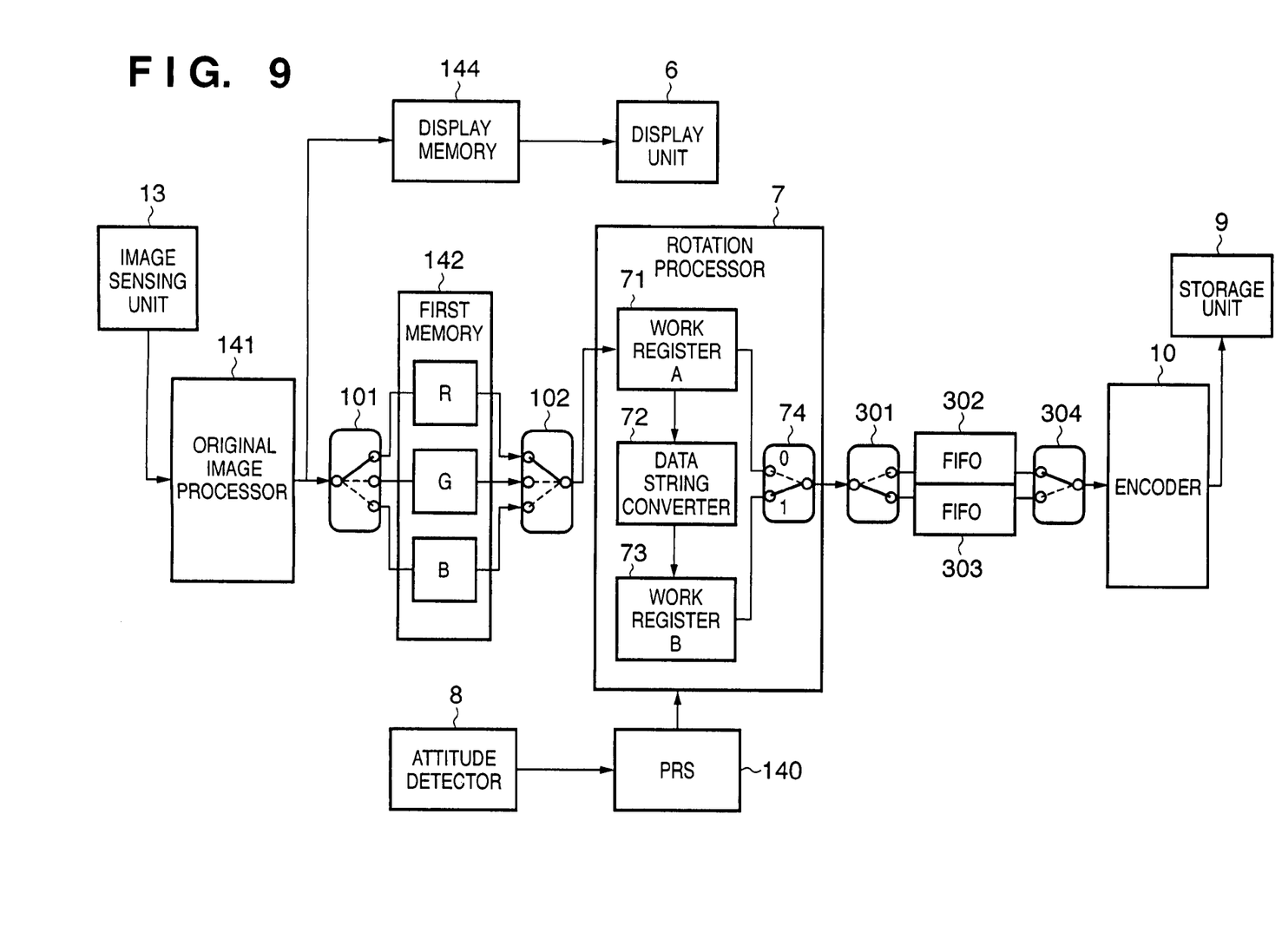
FIG. 9 is a block diagram illustrating the structure of a digital camera according to a third embodiment of the present invention.

FIG. 9 illustrates the structure of an image processing apparatus according to a third embodiment of the invention.

In FIG. 9, the second memory 143 has been eliminated from the structure of FIG. 1 and two FIFO memories have been inserted. Further, the insertion of the two FIFO memories is accompanied by the addition of two switches for selecting either of these FIFO memories. Other structural components are the same as those of the first embodiment in FIG. 1 and the explanation of them is omitted. Processing involving the FIFO memories will now be described.

In a case where an image has been taken in the portrait orientation, rotation processing in which 8×8 pixels are adopted as one unit is executed by the rotation processor 7 starting from any of the R, G, and B color components, as described in the first embodiment, and the output resulting from this processing is input to either one of two FIFO memories 302, 303 via a switch 301.

When storage of 8×8 pixels of data is completed, the switch 301 changes over the output destination to the other one of the FIFO memories. When the next cycle of rotation processing is executed, the resulting output is stored in the FIFO memory at the destination to which the changeover has been made and the FIFO memory in which storage of data has already been completed outputs its content to the encoder 10 successively via the switch 304. The image data that has been input to the encoder 10 is encoded and then output to the storage unit 9.

The FIFO memories 302, 303 each have a capacity equivalent to 64 pixels (8×8 pixels). The two FIFO memories 302, 303 are changed over alternatingly by the switches 301, 302.

Further, since it is necessary that the processing speeds per pixel from the first memory 142 to the encoder 10 be made the same, processing is executed at a processing speed governed by whichever block has the lowest speed. However, since the memory that delivers the data from the rotation processor 7 to the encoder 10 is a FIFO memory, a cost-related advantage is obtained.

In accordance with the third embodiment, as described above, image data that has been captured in the portrait orientation is compressed and encoded and recorded in a storage unit after being subjected to rotation processing in accordance with the attitude of the camera at the time of photography. As a result, rotation processing at the time of display and playback is unnecessary and the length of time required for processing for a portrait-oriented display can be shortened.

It should be noted that in the first to third embodiments, the signal that is to undergo rotation processing need not be one having R, G, and B color components and may be any signal with which the functions of the present invention can be achieved.

Further, application of the present invention is not limited to a digital camera. The invention can be applied to optical equipment and devices other than cameras and is applicable to any device in which an image signal obtained by image sensing using photoelectric conversion elements arrayed in two dimensions is converted and finally output to an output unit such as a monitor or printer.

Further, it would be obvious to those skilled in the art that it is also possible to readily support rotation processing in a case where an image has been rotated by 180° in the clockwise direction or by 90° in the counter-clockwise direction and not only 90° in the clockwise direction.

Further, the embodiments set forth above deal with a hypothetical case where rotation processing is executed in such a manner that an image that has been captured in the portrait orientation is made to conform to a landscape-oriented monitor screen. However, in a case where the monitor screen of the display unit used in reproducing the image is long in the vertical direction, it will suffice if similar rotation processing is applied to an image that has been captured in the landscape orientation. Accordingly, it will suffice to set beforehand how rotation is to be performed when the image sensing apparatus is in any particular attitude in accordance with a reference orientation of the image sensing apparatus and the desired shape of the monitor screen (e.g., depending upon whether the monitor screen of a display unit mainly used to observe an image shot by the user is long horizontally or long vertically).

Other Embodiments

The present invention can be applied to an apparatus comprising system constituted by a plurality of devices (for example, host computer, interface, and camera head) or to a single device (for example, digital still camera, digital video camera).

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-228014, filed on Aug. 4, 2004, which is hereby incorporated herein by reference herein.

What is claimed is:

1. An image processing apparatus for processing image data that has been captured by an image sensing apparatus having a two-dimensional image sensing device, said apparatus comprising:
   an attitude information input unit that inputs attitude information representing the attitude of the image sensing apparatus;
   a rotating unit which divides the image data captured by the image sensing device into a plurality of divided image data that have a block size corresponding to a size by which a processing unit processes image data, and rotates the block-size image data in accordance with the attitude information input by said attitude information input unit; and
   a processing unit that processes the image data output from said rotating unit in units having the block size;
   wherein in a case where the attitude information indicates that the image sensing apparatus is not rotated relative to a reference attitude, said rotating unit inputs the block-size image data successively in a first order and outputs the block-size image data without rotating the block-size image data, and
   wherein in a case where the attitude information indicates that the image sensing apparatus is rotated clockwise through at least any one of 90°, 180° and 270° relative to the reference attitude, said rotating unit inputs the block-size image data successively in a second order which is determined by the relation between the first order and the rotation degree of the image sensing apparatus, rotates each of the block-size image data, and outputs the plurality of the rotated block-size image data.

2. The apparatus according to claim 1, further comprising a memory that stores one frame of image data that is output from the image sensing apparatus;
   wherein in a case where the attitude information indicates the rotation degree is 90° or 270°, said rotating unit reads out image data, which has been stored in said memory, in order by the blocks, in an orthogonal direction to a line direction of the image data, and applies rotation processing to the image data in units of blocks.

3. The apparatus according to claim 1, wherein said rotating unit includes:
   a first storage unit that has a capacity, which is equivalent to the block size, for storing the divided image data before the rotation processing is executed; and
   a second storage unit that has a capacity, which is equivalent to the block size, for storing the divided image data after the rotation processing has been applied thereto.

4. The apparatus according to claim 1, wherein said processing unit is an encoding unit that successively encodes the image data, which has been processed by said rotating unit, in units having the block size.

5. The apparatus according to claim 4, further comprising a storage unit that stores image data that has been encoded by said encoding unit.

6. The apparatus according to claim 1, further comprising a storage unit that successively stores image data, which has been processed by said rotating unit, on a storage medium in the units of the block size.

7. An image sensing apparatus having a two-dimensional image sensing device, comprising:
   an attitude detecting unit that detects the attitude of the image sensing apparatus;
   a rotating unit which divides the image data captured by the image sensing device into a plurality of divided image data that have a block size corresponding to a size by which a processing unit processes image data, and rotates the block-size image data in accordance with the attitude information input by said attitude detecting unit; and
   a processing unit that processes the image data output from said rotating unit in units having the block size;
   wherein in a case where the attitude information indicates that the image sensing apparatus is not rotated relative to a reference attitude, said rotating unit inputs the block-size image data successively in a first order and output the block-size image data without rotating the block size image data, and
   wherein in a case where the attitude information indicates that the image sensing apparatus is rotated clockwise through at least any one of 90°, 180° and 270° relative to the reference attitude, said rotating unit inputs the block-size image data successively in a second order which is determined by the relation between the first order and the rotation degree of the image sensing apparatus, rotates each of the block-size image data, and outputs the plurality of the rotated block-size image data.

8. An image processing method for processing image data that has been captured by an image sensing apparatus having a two-dimensional image sensing device, said method comprising:
   inputting attitude information representing the attitude of the image sensing apparatus;
   in a case where the attitude information indicates that the image sensing apparatus is not rotated relative to a reference attitude
       dividing the image data captured by the image sensing apparatus into a plurality of divided image data having a block size corresponding to a size by which processing is performed,
       inputting the block-size image data successively in a first order, and
       outputting the block-size image data without rotating the block-size image data; and in a case where the attitude information indicates that the image sensing apparatus is rotated clockwise through at least any one of 90°, 180° and 270° relative to the reference attitude dividing the image data captured by the image sensing apparatus into a plurality of divided image data that have a block size corresponding to a size by which processing is performed;

inputting the block-size image data successively in a second order which is determined by the relation between the first order and the rotation degree of the image sensing apparatus, and rotating the block-size image data in accordance with the attitude information input in said attitude information input step; and processing the rotated image data in units having the block size.

9. A computer-readable recording medium on which has been recorded a program for causing the image processing method set forth in claim 8 to be executed by a computer.

* * * * *